UNITED STATES PATENT OFFICE.

NIELS D. NIELSEN, OF ELYRIA, OHIO.

CARBURIZING MATERIAL.

1,416,501. Specification of Letters Patent. Patented May 16, 1922.

No Drawing. Application filed May 6, 1920. Serial No. 379,259.

*To all whom it may concern:*

Be it known that I, NIELS D. NIELSEN, a citizen of the United States, residing at Elyria, in the county of Lorain and State of Ohio, have invented certain new and useful Improvements in Carburizing Materials; and I do hereby declare the following to be a full, clear, and exact description of the invention, such as will enable others skilled in the art to make and use the same.

This invention relates to carburizing materials, such as are used in the process of hardening steel. It is well known that steel may be hardened by a "soaking" process carried on at about 1800° F., the soaking operation being one in which the steel is immersed in a carburizing material compound, such as bone meal, and the like, and the steel is thus caused to take up carbon from the compound after which the steel is quenched.

Bone meal and other similar animal mixtures, or vegetable mixtures which are at present used for hardening steel are too combustible to cause a very high per cent of carbon to be absorbed as compared to the amount of carbon burned by contact with the air.

In an earlier filed application, Serial Number 304,151, filed June 14, 1919, I have described and claimed a new hardening material formed by grinding fish scales into powder, the degree of fineness being more or less immaterial.

In the use of carburizing material, composed of fish scales, I have found that the material gives up its carbon to metals more readily than bone compound and the metal absorbs it more evenly, and that less of the carbon contained in the material is burned by contact with the air than has previously been the case with other materials.

I now find that although the above results secured have been very satisfactory, and that carburizing material composed entirely of fish scales is highly efficient, the cost of securing fish scales alone may be more than the cost of the same amount of fish scales contained on the body of entire fishes. For instance, such fishes as the gar-pike and many other fishes unfitted for food purposes may be purchased very cheaply, and I have discovered that the other parts of the body of a fish are of such chemical constituency as to enable one to use entire fish bodies, including the scales, bones and flesh, without necessitating the labor of removing the scales; and that when such bodies are dried and pulverized a very good carburizing material results, the same containing a relatively high per cent of icthylepidin, as referred to in the above-mentioned application, and the other parts of the body, aside from the scales contain useful elements, such as carbon, which aid in the carburizing process.

Having thus described my invention, what I claim and desire to secure by Letters Patent is:

The process of hardening metals, consisting in drying whole fish bodies, pulverizing the same and in heating said metals in the pulverized material resulting until the desired amount of carbon is absorbed and then quenching to suddenly lower the temperature.

In witness whereof, I have hereunto signed my name this 21st day of April, 1920.

NIELS D. NIELSEN.